United States Patent [19]
Beninga et al.

[11] 3,767,518
[45] Oct. 23, 1973

[54] ORGANIC RESIN GLASS COMPOSITE AND METHOD FOR MAKING SAME

[75] Inventors: Duane H. Beninga, Arvada; Hugh P. Gibbons, Boulder, both of Colo.

[73] Assignee: Coors Porcelain Company, Golden, Colo.

[22] Filed: Sept. 16, 1971

[21] Appl. No.: 181,267

Related U.S. Application Data

[63] Continuation-in-part of Ser. No. 736,527, May 27, 1968, Pat. No. 3,607,607, Continuation-in-part of Ser. No. 638,879, May 16, 1967, abandoned.

[52] U.S. Cl. ............... 161/146, 156/298, 161/196, 161/203, 161/213, 161/216
[51] Int. Cl. .......................................... B32b 15/08
[58] Field of Search .................. 161/36, 37, 38, 39, 161/40, 158, 162, 164, 168, 202, 203, 204, 213, 216, 221, 146, 196; 117/DIG. 1, 27; 118/76; 156/89, 114, 293, 298, 299, 303.1, 308; 52/181, 315, 318, 389, 390

[56] References Cited
UNITED STATES PATENTS

| | | |
|---|---|---|
| 2,806,509 | 9/1957 | Bozzacco et al.................... 161/162 |
| 2,618,572 | 11/1952 | Parrish.............................. 118/76 X |
| 3,167,438 | 1/1965 | Bristow................................ 106/46 |
| 3,607,607 | 9/1971 | Beninga et al...................... 161/168 |
| 3,335,048 | 8/1967 | Morain ................................ 161/38 |
| 2,171,438 | 8/1939 | Tarbox................................ 156/114 |

*Primary Examiner*—George F. Lesmes
*Assistant Examiner*—M. E. McCamish
*Attorney*—Reising, Ethington, Perry & Thorpe

[57] ABSTRACT

A composite of organic resin and glass wherein the resin is bonded to the glass through an intermediate deposit of titanium or zirconium, preferably the former, on the glass, this intermediate metal deposit being applied to the glass by contacting the glass with titanium or zirconium with sufficient force and relative motion to cause the titanium or zirconium to be bonded to the glass.

6 Claims, No Drawings

ORGANIC RESIN GLASS COMPOSITE AND METHOD FOR MAKING SAME

This patent application is a continuation-in-part of our United States application Ser. No. 736,527 filed May 27, 1968, now U.S. Pat. No. 3,607,607, which, in turn, was a continuation-in-part of our then pending but now abandoned U.S. Pat. application Ser. No. 638,879 filed May 16, 1967.

The subject matter of the present invention is an improved composite of an organic resin and glass, and a method for making same. Composites made in accordance with the present invention are useful in numerous applications as, for example, where a seal is desired between glass and an elastomer or other organic resin.

It is the principal object of the present invention to provide an improved organic resin-glass composite having greatly increased bond strength between the resin and the glass. An attendant object is the provision of an improved method for making such a composite.

Briefly, these objects are accomplished in accordance with the invention by mechanically contacting the glass with a solid titanium or zirconium, preferably titanium, with sufficient force and relative motion between the glass and the metal to cause the metal to deposit on and bond to the surface of the glass, and then bonding the resin to the metallized surface of the glass.

The glass can be of any of a wide variety of types and, so far as known, the invention serves to advantage with all types of glass. Typical, for example, are the soda lime glasses used for windows and other flat glass and for bottles and other containers. Other examples are borosilicate glass and lead glass.

In the practice of the invention the titanium or zirconium deposit between the glass and the organic resin is applied to the glass by forceful mechanical contact such that the titanium or zirconium is abraded or rubbed onto the glass. It is by way of such contact that the good bond strength is accomplished.

A preferred method for the application of the titanium or zirconium to the glass is to contact the glass with a rotating titanium or zirconium wire brush. As still another means of applying the metal, the glass pieces, if sufficiently thick to have good strength, can be shot blasted with titanium or zirconium metal pellets.

It is generally more difficult to attain a really strong bond of glass to rubber or other elastomer than to certain other organic resins and hence the invention serves to particular advantage where elastomer is desired to be bonded to the glass. However, the mechanically applied metallized surface of this invention does provide an increase in bond strength between the glass and organic resins other than the elastomers. For example, organic resins such as epoxy resin or polyester resin, the vinyl resins such as polyvinyl chloride, polystyrene, polymethylmethacrylate, nylon, elastomeric or non-elastomeric polyurethane, and the like all can be used in the practice of the invention. The important point is that by way of the present invention, greatly increased bond strength between the organic resin and the glass can be accomplished and the organic resin can be selected, for any particular application, with other characteristics in mind to best meet the needs of that application at the least cost. To accomplish the bond between the resin and the thin titanium or zirconium deposit on the glass, the resin can be molded against the deposit. Also, a preshaped body of the resin can be softened by heat at the location where it is to be joined to the glass and then pressed against the deposit on the glass. In the case of the thermosets such as epoxy or polyester resin, the resin can be applied to the deposit in its viscous liquid stage and then caused or allowed to cure.

It is preferable that the titanium or zirconium deposit on the glass surface be discontinuous rather than continuous. That is, it is desirable that the metal deposit be interrupted by small areas of exposed glass though a major portion of the total glass surface area should be covered with the metal. Ideally, the metal deposit should consist of the highest possible density of individual spots or lines minutely separated from each other by exposed glass. We theorize the reason for this is that a metal deposit consisting of a network of minutely separated metallized areas can withstand greater thermal and mechanical stresses than can a continuous film of metal even though the latter should theoretically provide greater bond strength.

It will be understood that whereas the invention has been described with reference to certain embodiments thereof, various changes and modifications may be made all within the full and intended scope of the claims which follow.

The embodiments of the invention in which an exclusive property or privilege is claimed are defined as follows:

1. A method for making an organic resin-glass composite comprising the steps of contacting a glass body with a solid metal selected from the group consisting of titanium and zirconium with sufficient force and relative motion to cause metal to be rubbed onto and bonded to said glass body, and then bonding organic resin to the resultant metallized surface of said glass body.

2. A method as set forth in claim 1 wherein the metal used is titanium.

3. An organic resin-glass composite comprising at least one glass body bonded to an organic resin through an intermediate metal deposit applied to the glass body by contacting the glass body with a solid metal with sufficient force and motion to cause metal to be rubbed onto and bonded to the glass body, said metal being selected from the group consisting of titanium and zirconium.

4. An organic resin-glass composite as set forth in claim 3 wherein the metal is titanium.

5. An organic resin-glass composite as set forth in claim 3 wherein said metal deposit is interrupted by a plurality of small portions of the surface of said glass body which are in direct contact with the resin.

6. An organic resin-glass composite as in claim 5 wherein the metal is titanium.

* * * * *

Disclaimer 3,767,518.—*Duane H. Beninga*, Arvada, and *Hugh P. Gibbons*, Boulder, Colo. ORGANIC RESIN GLASS COMPOSITE AND METHOD FOR MAKING SAME. Patent dated Oct. 23, 1973. Disclaimer filed Mar. 28, 1974, by the assignee, *Coors Porcelain Company*.

Hereby disclaims the portion of the term of the patent subsequent to Sept. 21, 1988.

[*Official Gazette May 7, 1974.*]